United States Patent [19]
Oksman

[11] 3,970,731
[45] July 20, 1976

[54] BUBBLE-GENERATING AERATOR

[76] Inventor: Erkki Olavi Oksman, Mayratie 6 A, Helsinki 80, Finland

[22] Filed: Jan. 22, 1975

[21] Appl. No.: 543,053

[30] Foreign Application Priority Data
Jan. 23, 1974 Finland .................................. 185/74

[52] U.S. Cl. .............................. 261/122; 261/124
[51] Int. Cl.² .................... B01D 47/02; C02C 1/12; C02D 1/00
[58] Field of Search ............ 261/122, 124; 239/145; 210/220

[56] References Cited
UNITED STATES PATENTS

| | | |
|---|---|---|
| 1,677,502 | 7/1928 | Sweetland............................ 261/122 |
| 1,936,305 | 11/1933 | Leffler................................. 261/122 |
| 1,940,350 | 12/1933 | Havtz.................................. 261/122 |
| 2,008,363 | 7/1935 | Maris................................... 261/122 |
| 3,048,339 | 8/1962 | Tapleshay........................... 261/122 |
| 3,330,645 | 7/1967 | Moustier et al..................... 261/122 |
| 3,396,950 | 8/1968 | Wood .................................. 261/124 |
| 3,603,509 | 9/1971 | Nechive............................... 261/122 |
| 3,768,788 | 10/1973 | Candel................................ 261/122 |

FOREIGN PATENTS OR APPLICATIONS

| | | |
|---|---|---|
| 1,009,829 | 1952 | France................................ 261/122 |
| 1,247,395 | 1971 | United Kingdom................ 261/122 |

*Primary Examiner*—Tim R. Miles
*Assistant Examiner*—Gregory N. Clements
*Attorney, Agent, or Firm*—Haseltine, Lake & Waters

[57] ABSTRACT

A bubble generating aerator comprising a disc-like or tubular aerating element made of a sintered open-pore plastics material, the element being submerged in a surrounding liquid and connected to a pressure gas source for supplying gas into the element and discharging the gas from one surface of said element as gas bubbles into the liquid. The discharge surface of the element is provided with a number of mutually spaced recesses larger than the pores of the element into which recesses the gas discharging from the element first enter as small bubbles and are combined to form larger bubbles before finally discharging from the element into said surrounding liquid.

11 Claims, 12 Drawing Figures

BUBBLE-GENERATING AERATOR

The present invention relates to a bubble aerator which comprises an aerating unit made of a sintered open-pore material, which unit can be connected to a pressure gas source so as to pass gas into the open-pore unit and to remove the gas as bubbles through at least one surface of the element into surrounding liquid.

In order to oxidate sewage and other polluted waters, various tube and disc aerators are used in which air is forced through narrow channels, holes or nozzles. When a very small bubble size is desired, objects, such as tubes, discs or caps - so-called domes- sintered from fine-grain ceramic or plastics powder are used. These objects are often installed so that, part of the section of the sintered object facing towards the pressure, is covered, the outer surface of the object being turned downwards in the liquid in order that small bubbles should not be combined into large ones. Such tubes are also used in whose lower part the formation of bubbles is not prevented. In order to obtain bubbles of medium size, a coarser sintered material is correspondingly used, as well as fibrous material which has been supported by a skeleton construction, and in order to obtain very large bubbles, various simple nozzles of metal or plastics are used, whose hole size determines the bubble size.

At large biological sewage water purification plants, it has been possible to save substantial compressor energy by arranging the aeration so that at the initial stage of the purification process very large bubbles are used, whose production takes considerably less energy than the production of small bubbles, which are used only at the end stage of the purification.

A drawback of these known aerators is that in the course of time the bubble size does not remain constant, as a result of the fact that even a small quantity of various materials insoluble in water and coming from the air compressor, such as oil, rust, etc., is deposited in the aerator pores and on the aerator surface thus changing both the pore size or nozzle channel and the hydrophic-hydrophobic equilibrium, i.e., the hydrophobic properties, on which the size of large bubbles is mainly dependent. The best type has proved to be a disk-shaped micro-bubble aerator with relatively thick walls, made of large-molecule polyethylene, because it is, for a long time, capable of holding in its inner surface the detrimental materials coming from the air. Due to its thickness, it is also strong, but the thicker this disk is, the higher is, however, also the counterpressure.

Another drawback, which has not been avoided by this aerator either and which is very common with almost all aerators, is the circumstance that originally equally large bubbles tend to collide with each other when the air flow increases with the result that very large bubbles are broken into smaller ones and, on the contrary, small bubbles are combined into larger ones while the bubble size tends to change towards some medium size only. Another drawback, which is highly significant in practice, is that in a large purification plant it is necessary to have both large-bubble and micro-bubble aerators on stock, whereas earlier only one aerator type was sufficient.

An object of the present invention is to eliminate the above drawbacks, above all both that resulting from the change in the hydrophilic-hydrophobic equilibrium and the instability of bubble size resulting from collisions of bubbles, and to achieve this so that the resistance is not increased when the strength is increased.

These objectives are achieved by means of a bubble aerator in accordance with the invention, which is characterized in that, at least in said one surface of the unit, recesses have been formed, larger than the pores in the disk, so as to collect the gas bubbles discharged from the pores into larger gas bubbles.

When the open-pore unit of the bubble aerator in accordance with the invention, provided at one surface with recesses, is submerged in water with the surface with the recesses directed upwards and when pressure air is passed into the unit through the lower surface of the unit, it is noticed that the passing resistance is lowest at the bottoms of the recesses. At the beginning, the recesses are full of water, but when air is passed into the unit, at the beginning small bubbles are formed at the recess bottoms. Due to capillary forces, the small bubbles, surprisingly, do not become detached from the recess surface but are cmbined into large bubbles which are expanded in the recess without becoming loose. Particularly so if the porous material is hydrophobic, i.e., water-rejecting, as is, for example, large-molecule sintered ethene plastics. When the recess is all filled with air and its inner pressure finally exceeds the capillary force at the edge of the recess, the bubble becomes loose. The bubbles produced in this way are always of uniform size despite possible change in the pore size of the unit as a result of adhering hydrophilic particles contained in the air, because their size is very closely dependent on the recess size and no other factor can affect it and because the air passes laminarily through the unit and also becomes loose from its surface without forming turbulence. Moreover, when the distances of the recesses from each other are made large enough so that neighbouring bubbles do not collide against each other despite the fact that their movement upwards is not linear, since the movement of the water above the aerator is turbulent, they remain equally large up to the liquid surface. In contrast with what might perhaps be expected, even very low recesses prevent bubbling at the surface of a porous unit, because controlled formation of bubbles requires so much less energy in recesses than at the unit surface. This is why it is as a rule advantageous to make the recesses deep also when only medium size bubbles are desired in order that even in this case the resistance should be the lowest possible.

The face opposite to the surface provided with recesses of the unit of a bubble aerator in accordance with the invention may be smooth or likewise provided with recesses, whose size is smaller than the size of the first-mentioned recesses. In both cases, when the unit is turned upside down, bubbles can be discharged from this second surface of the unit, the size of which bubbles is smaller that that of the bubbles being discharged from the first-mentioned surface of the unit. In this way the same unit can be used both as a large-bubble aerator and as a small-bubble aerator.

When the opposite face of the unit is smooth and directed upwards, the small bubbles are created exclusively above the recesses in the lower surface, so that combination of bubbles in the turbulent water flow is prevented completely, so that the bubbles produced remain small and of a uniform size up to the water surface. In this case the bubble size depends on the size of the pores in the unit and on the hydrophilic-hydrophobic equilibrium of the porous material, and these qualities can be varied by means of known methods.

When the unit is made of an open-pore material which, as sintered in an oxygen-free space, is highly hydrophobic but which, during a long aeration process, becomes weakly hydrophilic mainly as a result of fine-grain hydrophilic material being collected in the pores, by means of different methods, with various hydrophobic coating plates, films, or rings, it is possible to ensure that the remaining bubble formation spaces will be hydrophobic, as will be explained more in detail later on.

The invention will be described more closely below with reference to the attached drawing, wherein FIG. 1 shows an axial section of a preferred embodiment of the bubble aerator in accordance with the invention as submerged in liquid with the bubble formation disk being provided at one side with recesses, FIG. 2 shows the bubble aerator of FIG. 1 as viewed from above, FIG. 3 shows an axial section of a bubble formation disk of a second embodiment, which disk is provided at both sides with recesses, FIG. 4 shows an axial section of a third embodiment of a bubble formation disk, in which a hydrophobic coating plate has been fastened onto the disk, FIg. 5 shows an axial section of a fourth embodiment of a bubble formation disk, in which hydrophobic rings have been fastened at the edges of the recesses in the disk, FIG. 6 shows an axial section of a fifth embodiment of a bubble formation disk, in which nozzle sleeves have been fastened at the recesses of the disk, FIG. 7 shows an axial section of a sixth embodiment of a bubble formation disk, in which a particular distribution plate has been fastened onto the disk, FIG. 8 shows an axial section of an alternative embodiment of the bubble aerator, FIG. 9 shows an axial section of a seventh embodiment of a bubble formation disk, in which the recesses in the disk are branched, and FIG. 10 shows, as a partial axial section, a bubble aerator that is provided with a cylindrical bubble formation tube, FIG. 11 shows a section taken along line XI – XI in FIG. 10, and FIG. 12 shows a second embodiment of a cylindrical bubble formation tube.

The aerator shown in FIGS. 1 and 2 of the drawing comprises a cup-shaped support frame 1 and a bubble formation disk 3 fastened on frame 1 by means of a fastening ring 2. The bottom of the frame 1 accommodates an inlet pipe 4, which is designed so as to be connected with a pressure gas source, such as a pressure air source. The aerator is designed to be submerged in a liquid, such as water.

The disk 3 is made of sintered plastics powder, for example of large-molecule ethene plastics, into an open-pore structure, and it has a tight circumferential edge section 5. One face 3a of the disk is provided with a number of recesses 6 with closed bottoms, whereas the opposite face 3b of the disk has been allowed to remain smooth.

When air flows into the space 7 between the disk 3 and the frame 1, the air can extend along the entire bottom surface of the disc and penetrate into the open-pore structure of the disk. At the beginning, the recesses of the disk are full of water, but when air penetrates through the disk, small bubbles start being formed at the closed bottoms of the recesses, at which positions the flow resistance of the disk is lowest. The small bubbles become larger bubbles, which become loose from the recesses when the internal pressure exceeds the capillary force and rise into the surrounding water as large bubbles 8. The size an depth of the recesses thus determine the size of the bubbles 8.

When the disk 3 is turned so that its smooth face 3b comes to face upwards and is subjected to pressure air, the air penetrates through the disk and is discharged from the disk as small bubbles whose size substantially corresponds to the size of the open pores in the disk. The bubbles are, however, only discharged above the recesses, because, in this case as well, the flow resistance is lowest at the recesses. Thus, the bubbles rise in the water without meeting each other, despite the turbulence.

FIG. 3 shows a disk 13, in which the other face 13b of the disk is also provided with recesses 16, which are, however, smaller than the recesses 6 in the opposite face 13a. In this way, when the recesses 16 are turned upwards, bubbles are obtained which are smaller than the bubbles developed by the recesses 6 but larger than bubbles developed by a mere smooth surface of the disk.

It is preferable to cover the disk with a coating of a hydrophobic material in order to maintain the hydrophobic nature of the recesses in the disk so that the originally highly hydrophobic disk material should not, in the course of time, be converted to slightly hydrophilic as a result of hydrophilic material adhering in its pores.

According to FIG. 4, the disk 23 is covered with a plate 21, which is, for example, of hard PVC, which has a sufficient outdoor durability. The plate has holes 22 at the recesses 26 in the disk. The diameter of the holes 22 may be smaller than the diameter of the recesses 26. The same result is obtained by glueing an appropriate plastics film onto the surface or by coating the surface with a varnish film.

According to FIG. 5, only the edges of the recesses 36 in the disk 33 are provided with rings 31 of a hydrophobic material. The same result can be obtained if the edges of the recesses made into a porous polyethene disk are heated to about 200°C by means of a suitable metal tool so that the edges melt into a unified surface which remains hydrophobic longer than the originally porous surface, because hydrophilic particles no longer adhere to the surface.

In the disk 43 in accordance with FIG. 6, the rings in accordance with FIG. 5 have been designed as nozzle sleeves 41.

In the embodiment shown in FIG. 7, the disk 53 is covered by an all-plastics cover 51, which is provided with ribs 54 that reinforce the structure and, at the same time, function as separating walls between different sections of the recesses 56 in the disk. The cover has holes 52 at the recesses 56.

Figure 10:
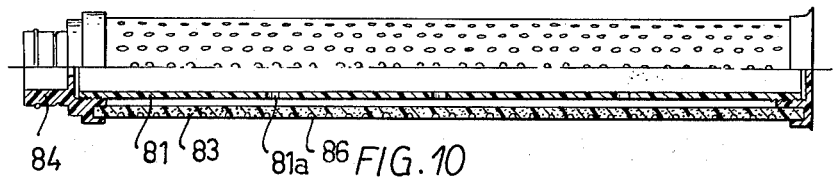
Figure 11:
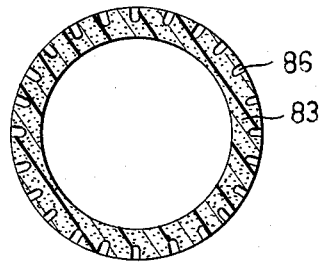

FIGS. 10 and 11 show an aerator in which a cylindrical bubble formation tube 83 is used that has been fastened between the end flanges of a tubular support frame 81. The support frame is closed at one end and at the other end provided with an inlet pipe 84, which has been designed to be connected to a pressure air source so as to pass air through holes 81a in the support frame into the bubble formation tube 83. This air penetrates, by the effect of the pressure, through the open-pore tube and is discharged as bubbles into the surrounding liquid. In the outer surface of the bubble formation tube, recesses 86 have been formed at a uniform spacing around the entire surface, which recesses function, in the manner mentioned above, as recesses collecting small bubbles. The axes of the recesses are in this embodiment positioned radially.

Figure 12:
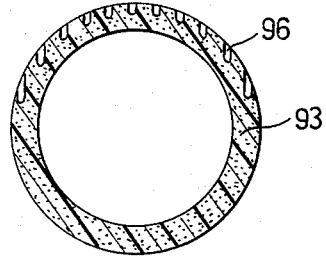

FIG. 12 shows a cylindrical bubble formation tube 93 on whose outer surface recesses 96 have been formed only at the upper half of the tube. The axes of the recesses are directed perpendicularly to the axial plane of the tube.

The examples below additionally illustrate the possibilities of carrying the invention into effect.

EXAMPLE 3

A disk similar to that described in example 2 was prepared, and the disk was provided with a fluorplastics-copolymer coating. The disk is designated as no. 5, and the measurements were made in accordance with example 1.

EXAMPLE 4

A disk similar to disk no. 2 was prepared, the edges of which disk were melted and formed as gently sloping edges by means of conical mandrel at 200°C. The disk is designated as no. 6, and the measurements were made in accordance with example 1.

EXAMPLE 5

Figure 5:
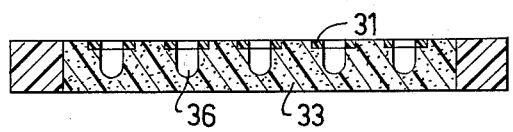
Figure 6:
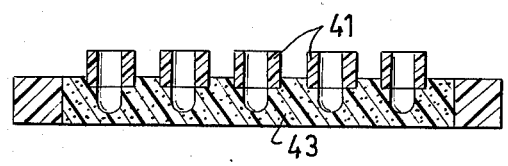
Figure 7:
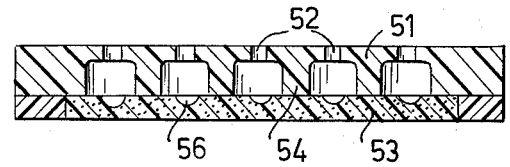
Figure 8:
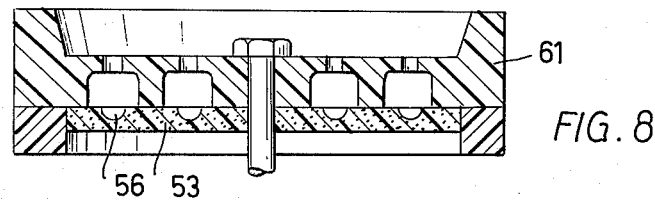
FIG. 8 shows a modification of the cover in accordance with FIG. 7. The cover 61 shown in this Figure can be substituted for the present aeration domes so that the old aeration dome systems can, without accessories, be provided with bubble aeration domes in accordance with the present invention.
Figure 9:
FIG. 9 shows a disk 73 in which the recesses 76 have been designed as branched. In consideration of the bubble size, the same number of large bubbles represents a much larger volume than small bubbles, for which reason, in certain cases, it may be advantageous to make the recesses branched.

Holes similar to those described in example 2 were drilled into a 0.5 mm thick polyvinylchloride plate and, moreover, concentrically with these holes 12 mm diameter holes were drilled into a 7 mm thick polyvinylchloride plate. Moreover, into a 7 mm thick porous ethene plastics disk, 7 mm diameter, 6 mm deep recesses were drilled concentrically with the former holes. Hereupon the plates were glued together as shown in FIG. 5. The disk obtained in this way is designated as no. 7, and the measurements were made in accordance with example 1.

Results of the tests with disks

| Disk No. | Recesses Diam. mm | Depth mm | Size and resistance of large bubbles | | | | | | Size and resistance of small bubbles | | | | | |
|---|---|---|---|---|---|---|---|---|---|---|---|---|---|---|
| | | | Beginning of test | | | After 2 weeks | | | Beginning of test | | | After 2 weeks | | |
| | | | Size+ | | Resistance | Size+ | | Resistance | Size+ | | Resistance | Size+ | | Resistance |
| | | | 20 cm φ mm | 2 m φ mm | Δ p mmvp++ | 20 cm φ mm | 2 m φ mm | Δ p mmvp++ | 20 cm φ mm | 2 m mm | Δ p mmvp++ | 20 cm φ mm | 2 m mm | Δ p mmvp++ |
| 1 | 0 | 0 | — | — | — | — | — | — | 3 | 3 | 200 | 2–3 | 2–3 | 430 |
| 2 | 7 | 6 | 9 | 9 | 70 | 4 | 4 | 290 | 3–4 | 4 | 200 | 2–3 | 2–3 | 300 |
| 3 | 3 | 6 | 5 | 5 | 85 | 3 | 3 | 500 | 3–4 | 3 | 290 | 2–3 | 2–3 | 510 |
| 4 | 7 | 6 | 10 | 10 | 119 | 9–10 | 8–10 | 360 | 3–4 | 3 | 270 | 2–3 | 2–3 | 350 |
| 5 | 7 | 6 | 9 | 9 | 114 | 8–9 | 8–9 | 460 | 3–4 | 4 | 270 | 2–3 | 2–3 | 460 |
| 6 | 7 | 6 | 10 | 10 | 98 | 8–9 | 8–9 | 205 | 3–4 | 4 | 320 | 2–3 | 2–3 | 200 |
| 7 | 7 | 4 | 11 | 10 | 85 | 9–10 | 9–10 | 375 | 3–4 | 4 | 300 | 2–3 | 2–3 | 375 |

+The bubble sizes are given in mm at distances 20 cm and 2 cm below the water surface.
++The resistance is that of the disk to the flow of air therethrough given as mm of pressure.

EXAMPLE 1

Figure 1:
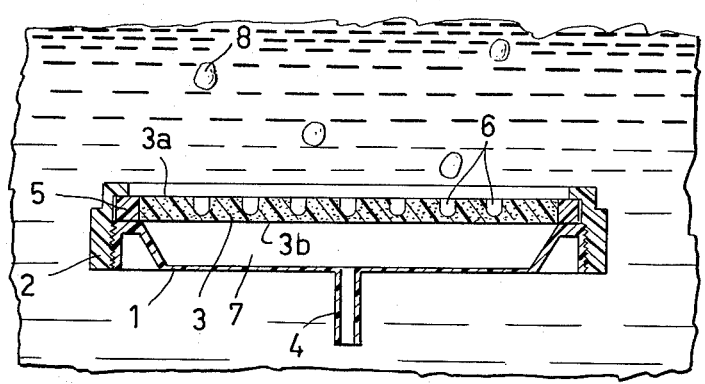
Figure 2:
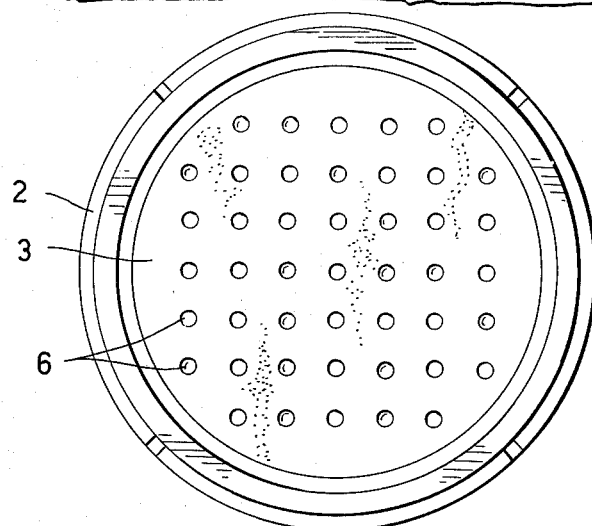
Figure 3:
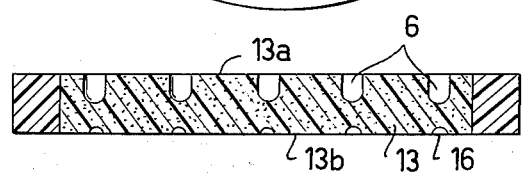

Recesses of different diameters were drilled, as shown in FIG. 1, into aeration disks nos. 2 and 3 taken directly out of production and made of sintered high density polyethylene. At the beginning of the test and after 2 weeks, the air resistance of the disks 2 and 3 was measured at the rate of 5 m³ air per hour, whereby the static counterpressure of water was reduced from the measurement result, and the bubble size was also evaluated both 20 cm and 2 m above the aerator with the disks being in both positions. The results were compared with corresponding measurement results of an ordinary aeration disk no. 1, taken out of production.

EXAMPLE 2

Figure 4:
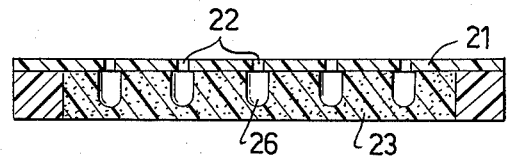

A similar disk provided with recesses, as compared with disk no. 2, was prepared and on it a 0.5 mm thick hard polyvinylchloride plate was glued, in accordance with FIG. 4, which plate was provided with holes of 7 mm, which holes coincided precisely concentrically with the recesses in the disk. The disk is designated as no. 4 and the measurements were made in accordance with example 1.

The drawing and the related descriptions are only intended to illustrate the concept of the invention. In its details the bubble aerator in accordance with the invention may vary to a considerable extent within the scope of the claims. Even though only a plane disk has been described above, it is evident that this shape as such is not decisive, and, for example, a convex and curved aeration disk can be made in accordance with the present invention.

What I claim is:

1. A bubble aerator comprising and aerating element constituted of a sintered open pore material, said aerating element being of disc shape and having opposite surfaces thereof, and a mounting means supporting said element for supplying air to a first surface thereof while said element is submerged in a liquid and the second surface thereof is exposed to said liquid, said element being provided with recesses in said second surface which recesses have closed bottoms and are larger in size than the pores in the element to collect gas bubbles discharged from the pores and discharge the gas in the form of larger bubbles from the element.

2. A bubble aerator as claimed in claim 1 wherein the first surface of the element is smooth.

3. A bubble aerator as claimed in claim 1 wherein the first surface of the element is provided with further recesses of a size smaller than that of the first said recesses but larger than the pores.

4. A bubble aerator as claimed in claim 1 comprising a coating of a hydrophobic material on said second surface, said coating being provided with holes in registry with said recesses.

5. A bubble aerator as claimed in claim 4 wherein said coating consists of a plate secured onto said second surface of the element.

6. A bubble aerator as claimed in claim 4 wherein said coating consists of a film of a hydrophobic material on said second surface of the plate.

7. A bubble aerator as claimed in claim 4 wherein said coating consists of a layer of a hydrophobic material spread onto said second surface of the element and leaving said recesses uncovered.

8. A bubble aerator as claimed in claim 1 comprising rings of a hydrophobic material secured to said one surface of said element and surrounding the edges of said recesses in said second surface.

9. A bubble aerator as claimed in claim 8 wherein said rings are nozzle sleeves.

10. A bubble aerator as claimed in claim 1 wherein said recesses have bounding surfaces which have been melted into unified surfaces.

11. A bubble aerator as claimed in claim 1 wherein said recesses are branched.

* * * * *